United States Patent
Zhao et al.

(10) Patent No.: US 11,368,928 B2
(45) Date of Patent: Jun. 21, 2022

(54) ASSOCIATION METHOD, INSTRUCTION METHOD, AND DEVICE FOR SYNCHRONIZATION BLOCK AND PAGING-SCHEDULING SIGNALING MESSAGE

(71) Applicant: China Academy of Telecommunications Technology, Beijing (CN)

(72) Inventors: Zheng Zhao, Beijing (CN); Ren Da, Beijing (CN); Fang-Chen Cheng, Beijing (CN); Qiubin Gao, Beijing (CN); Bin Ren, Beijing (CN); Tie Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/765,160

(22) PCT Filed: Aug. 28, 2018

(86) PCT No.: PCT/CN2018/102788
§ 371 (c)(1),
(2) Date: May 18, 2020

(87) PCT Pub. No.: WO2019/095783
PCT Pub. Date: May 23, 2019

(65) Prior Publication Data
US 2020/0344703 A1    Oct. 29, 2020

(30) Foreign Application Priority Data
Nov. 17, 2017 (CN) .......................... 201711148912.3

(51) Int. Cl.
*H04W 4/06* (2009.01)
*H04W 56/00* (2009.01)
(Continued)

(52) U.S. Cl.
CPC ........... *H04W 56/001* (2013.01); *H04W 4/06* (2013.01); *H04W 4/12* (2013.01); *H04W 68/005* (2013.01)

(58) Field of Classification Search
CPC ....... H04W 4/06; H04W 4/12; H04W 56/001; H04W 56/0015; H04W 68/00; H04W 68/005; H04W 72/04; H04L 5/00
See application file for complete search history.

(56) References Cited

U.S. PATENT DOCUMENTS

| | | | |
|---|---|---|---|
| 9,445,389 B1 | 9/2016 | Kullman et al. | |
| 2012/0096442 A1* | 4/2012 | Kim | G06F 9/524 717/131 |

(Continued)

FOREIGN PATENT DOCUMENTS

| | | |
|---|---|---|
| CN | 104919872 A | 9/2015 |
| CN | 106162875 A | 11/2016 |

(Continued)

OTHER PUBLICATIONS

Qualcomm Incorporated "Paging Design Consideration", 3GPP TSG-RAN2 WG1 Meeting #99bis Prague, Czech Republic, Oct. 9-13, 2017, total 11 pages, R1-1718530.

(Continued)

*Primary Examiner* — Jean A Gelin
(74) *Attorney, Agent, or Firm* — Kilpatrick Townsend & Stockton, LLP (57) ABSTRACT

The present application discloses an association method, instruction method, and device for a synchronization block and a paging-scheduling signaling message. In the present (Continued)

application, a terminal performs beam sweeping on received synchronization blocks to obtain a target synchronization block; and the terminal, according to a correspondence between a synchronization block and a paging-scheduling signaling message, determines a paging-scheduling signaling message corresponding to the target synchronization block.

20 Claims, 3 Drawing Sheets

(51) Int. Cl.
    *H04W 4/12* (2009.01)
    *H04W 68/00* (2009.01)

(56) References Cited

U.S. PATENT DOCUMENTS

| | | | |
|---|---|---|---|
| 2014/0044027 A1 | 2/2014 | Beale | |
| 2016/0242159 A1* | 8/2016 | Ho | H04B 7/0617 |
| 2017/0367058 A1* | 12/2017 | Pelletier | H04W 52/246 |
| 2018/0139742 A1* | 5/2018 | Sun | H04W 72/1231 |
| 2019/0306847 A1* | 10/2019 | Seo | H04L 25/022 |
| 2020/0028606 A1* | 1/2020 | Zhang | H04J 11/0073 |
| 2020/0036430 A1* | 1/2020 | Kim | H04W 24/04 |
| 2020/0037385 A1* | 1/2020 | Park | H04W 72/04 |
| 2020/0107294 A1* | 4/2020 | Ji | H04W 52/0229 |
| 2020/0305099 A1* | 9/2020 | Liu | H04B 7/0408 |

FOREIGN PATENT DOCUMENTS

| | | |
|---|---|---|
| CN | 106170930 A | 11/2016 |
| CN | 107079404 A | 8/2017 |
| WO | 2016186720 A1 | 11/2016 |

OTHER PUBLICATIONS

MediaTek Inc."Discussion on SS burst set composition", 3GPP TSG RAN WG1 Meeting Ad-Hoc#2, Qingdao, P.R. China, Jun. 27-30, 2017, total 3 pages, R1-1710798.

Huawei et al., "Offline summary for AI 7.1.3 on Paging for NR", 3GPP TSG RAN WG1 Meeting 90bis, Prague, Czech Republic, Oct. 9-13, 2017, total 5 pages, R1-1719037.

Qualcomm Incorporated,"Paging Design Consideration", 3GPP TSG-RAN WG1 Meeting NR#3, Nagoya, Japan, Sep. 18-21, 2017, total 10 pages, R1-1716382.

Ericsson,"On NR paging design", 3GPP TSG RAN WG1 NR adhoc #3, Nagoya, Japan, Sep. 18-21, 2017, total 4 pages, RI-1716153(R1-1714039).

MediaTek Inc."Further discussion on paging design", 3GPP TSG RAN WG1 Meeting 90bis, Prague, Oct. 9-13, 2017, total 9 pages, R1-1718332.

InterDigital, Inc."NR paging based on paging indication", 3GPP TSG RAN WG1 Meeting #90bis, Prague, CZ, Oct. 9-13, 2017, total 5 pages, R1-1718358(R1-1716260).

* cited by examiner

```
┌─────────────────────────────────────────────┐
│  a multiplexing mode of a synchronization block and a      │
│  paging-scheduling signaling message is determined, the base station │
│  transmits multiplexing mode indication information if a protocol   │──S301
│  stipulates that the multiplexing mode is indicated to a terminal by the │
│  base station through a signaling message, or else, the base station │
│  determines the multiplexing mode according to the pre-configuration │
│  of the protocol, wherein the multiplexing mode indication │
│  information is used for indicating the multiplexing mode of the │
│  synchronization block and the paging-scheduling signaling message │
└─────────────────────────────────────────────┘
                         ↓
┌─────────────────────────────────────────────┐
│  correspondence indication information is transmitted if the base │
│  station determines that the multiplexing mode of the synchronization │──S302
│  block and the paging-scheduling signaling message is time division │
│  multiplexing, wherein the correspondence indication information is │
│  used for indicating a correspondence between the synchronization │
│  block and the paging-scheduling signaling message │
└─────────────────────────────────────────────┘
```

ASSOCIATION METHOD, INSTRUCTION METHOD, AND DEVICE FOR SYNCHRONIZATION BLOCK AND PAGING-SCHEDULING SIGNALING MESSAGE

The present application is a National Stage of International Application No. PCT/CN2018/102788, filed on Aug. 28, 2018, which claims the priority of the Chinese patent application submitted to the China patent office on Nov. 17, 2017 with the application number of 201711148912.3 and the application name of "ASSOCIATION AND INSTRUCTION METHODS AND DEVICES FOR SYNCHRONIZATION BLOCK AND PAGING-SCHEDULING SIGNALING MESSAGE", the entire contents of which are incorporated herein by reference.

FIELD

The present application relates to the field of wireless communication and in particular to an association method and an instruction method and a device for a synchronization block and a paging-scheduling signaling message.

BACKGROUND

A paging-scheduling signaling message may be transmitted in a beam scanning way, a paging message may be transmitted on a time resource corresponding to each beam direction, and a terminal may scan through a transmitted and/or received beam to determine a transmitted and/or received beam corresponding to the paging-scheduling signaling message.

The paging-scheduling signaling message and a synchronization block may adopt a time division multiplexing mode or a frequency division multiplexing mode. If the paging-scheduling signaling message and the synchronization block adopt the frequency division multiplexing mode, the expense of beam scanning may be reduced particularly under the condition that more high-frequency beams exist. However, the paging-scheduling signaling message and the synchronization block cannot adopt the frequency division multiplexing mode when a bandwidth supported by the terminal is relatively small, for example, the supported bandwidth is only the bandwidth of the synchronization block. In addition, the frequency division multiplexing mode may result in relatively large PAPR (Peak to Average Power Ratio) to bring influences to that a synchronization signal meets a link budget demand by power boosting. If the paging-scheduling signaling message and the synchronization block adopt the time division multiplexing mode, the terminal may wake up in advance before receiving the paging-scheduling signaling message to perform beam scanning to acquire downlink transmitted and/or received beam information, and then receive the paging-scheduling signaling message on a corresponding beam.

At present, there are no correspondences between the paging-scheduling signaling message and the synchronization block, in this way, it is possible that the expense and complexity of demodulating the paging-scheduling signaling message are increased under the condition that the paging-scheduling signaling message and the synchronization block adopt the time division multiplexing mode.

SUMMARY

An embodiment of the present application provides association and instruction methods and devices for a synchronization block and a paging-scheduling signaling message.

On the first aspect, provided is an association method for a synchronization block and a paging-scheduling signaling message, including:
  performing, by a terminal, beam scanning on a received synchronization block to obtain a target synchronization block; and
  determining, by the terminal, a paging-scheduling signaling message corresponding to the target synchronization block according to a correspondence between the synchronization block and the paging-scheduling signaling message.

In one embodiment, the method further includes: demodulating, by the terminal, the determined paging-scheduling signaling message.

In one embodiment, the correspondence between the synchronization block and the paging-scheduling signaling message is predetermined or pre-configured.

In one embodiment, the method further includes: receiving, by the terminal, correspondence indication information, and the correspondence indication information is used for indicating the correspondence between the synchronization block and the paging-scheduling signaling message.

In one embodiment, reserved synchronization blocks are divided into actually transmitted synchronization blocks and synchronization blocks which are not actually transmitted; the correspondence between the synchronization block and the paging-scheduling signaling message corresponding to the synchronization block includes a correspondence between each of the actually transmitted synchronization blocks and the paging-scheduling signaling message or a correspondence between each of the reserved synchronization blocks and the paging-scheduling signaling message.

In one embodiment, one synchronization block corresponds to one paging-scheduling signaling message.

In one embodiment, the correspondence indication information is used for indicating a time interval between the synchronization block and the paging-scheduling signaling message corresponding to the synchronization block.

In one embodiment, the correspondence indication information is used for indicating the number of time units of the interval between the synchronization block and the paging-scheduling signaling message corresponding to the synchronization block, and the time units include symbols or time slots.

In one embodiment, the method further includes: receiving, by the terminal, the paging-scheduling signaling message according to a multiplexing mode of the synchronization block and the paging-scheduling signaling message, and the multiplexing mode is predetermined or pre-configured.

In one embodiment, the method further includes: receiving, by the terminal, multiplexing mode indication information, and the multiplexing mode indication information is used for indicating the multiplexing mode of the synchronization block and the paging-scheduling signaling message.

In one embodiment, receiving, by the terminal, the multiplexing mode indication information includes:
  receiving, by the terminal, a broadcast signaling message, and the broadcast signaling message carries the multiplexing mode indication information, and the broadcast signaling message is a cell-level broadcast signaling message; or
  receiving, by the terminal, a broadcast signaling message, and the broadcast signaling message carries the multiplexing mode indication information, and the broadcast signaling message is a user-group-level broadcast signaling message.

In one embodiment, determining, by the terminal, the paging-scheduling signaling message corresponding to the target synchronization block according to the correspondence between the synchronization block and the paging-scheduling signaling message includes:

determining, by the terminal, the paging-scheduling signaling message corresponding to the target synchronization block according to the correspondence if the multiplexing mode of the target synchronization block and the paging-scheduling signaling message corresponding to the target synchronization block is time division multiplexing.

On the second aspect, provided is an instruction method including:

determining, by a base station, a multiplexing mode of a synchronization block and a paging-scheduling signaling message, and transmitting, by the base station, multiplexing mode indication information if a protocol stipulates that the multiplexing mode is indicated to a terminal by the base station, and the multiplexing mode indication information is used for indicating the multiplexing mode of the synchronization block and the paging-scheduling signaling message; and transmitting correspondence indication information if the base station determines that the multiplexing mode of the synchronization block and the paging-scheduling signaling message is time division multiplexing, and the correspondence indication information is used for indicating a correspondence between the synchronization block and the paging-scheduling signaling message, In one embodiment, transmitting, by the base station, the multiplexing mode indication information includes:

transmitting, by the base station, a broadcast signaling message, and the broadcast signaling message carries the multiplexing mode indication information, and the broadcast signaling message is a cell-level broadcast signaling message; or transmitting, by the base station, a broadcast signaling message, and the broadcast signaling message carries the multiplexing mode indication information, and the broadcast signaling message is a user-group-level broadcast signaling message.

In one embodiment, the synchronization blocks include actually transmitted synchronization blocks and reserved synchronization blocks; the correspondence between the synchronization block and the paging-scheduling signaling message corresponding to the synchronization block includes a correspondence between each of the actually transmitted synchronization blocks and the paging-scheduling signaling message or a correspondence between each of the reserved synchronization blocks and the paging-scheduling signaling message.

In one embodiment, one synchronization block corresponds to one paging-scheduling signaling message.

In one embodiment, the correspondence indication information is used for indicating a time interval between a synchronization block and a paging-scheduling signaling message corresponding to the synchronization block.

In one embodiment, the correspondence indication information is In one embodiment used for indicating the number of time units of the interval between the synchronization block and the paging-scheduling signaling message corresponding to the synchronization block, and the time units include symbols or time slots.

On the third aspect, provided is a terminal including:
a beam scanning module configured to perform beam scanning on a received synchronization block to obtain a target synchronization block; and
a determining module configured to determine a paging-scheduling signaling message corresponding to the target synchronization block according to a correspondence between a synchronization block and a paging-scheduling signaling message.

On the fourth aspect, provided is a base station including:
a determining module configured to determine a multiplexing mode of a synchronization block and a paging-scheduling signaling message;
a first transmitting module configured to transmit multiplexing mode indication information if a protocol stipulates that the multiplexing mode is indicated to a terminal by the base station, and the multiplexing mode indication information is used for indicating the multiplexing mode of the synchronization block and the paging-scheduling signaling message; and
a second transmitting module configured to transmit correspondence indication information if the multiplexing mode of the synchronization block and the paging-scheduling signaling message is determined to be time division multiplexing, and the correspondence indication information is used for indicating a correspondence between the synchronization block and the paging-scheduling signaling message.

On the fifth aspect, provided is a terminal including a processor, a memory and a transceiver, and the processor, the memory and the transceiver are connected by a bus; and the processor is configured to read programs in the memory to execute the method according to any one in the above-mentioned first aspect.

On the sixth aspect, provided is a base station including a processor, a memory and a transceiver, and the processor, the memory and the transceiver are connected by a bus; and the processor is configured to read programs in the memory to execute the method according to any one in the above-mentioned second aspect.

On the seventh aspect, provided is a computer readable storage medium, storing a computer executable instruction configured to enable a computer to execute the method according to any one in the above-mentioned first aspect.

On the eighth aspect, provided is a computer readable storage medium, storing a computer executable instruction configured to enable a computer to execute the method according to any one in the above-mentioned second aspect.

In the above-mentioned embodiment of the present application, the correspondence exist between the synchronization block and the paging-scheduling signaling message, and therefore, the paging-scheduling signaling message corresponding to the synchronization block may be determined according to the received synchronization block and the correspondence.

DETAILED DESCRIPTION OF THE EMBODIMENTS (2) The term "a plurality of" in the embodiments of the present application refers to two or more, and other quantifiers are similar to the term "a plurality of".

(3) "And/or" describes an association between associated objects and indicates that three relationships may exist, for example, A and/or B may indicates three conditions that A exists alone, A and B exist at the same time, and B exists alone. A character "/" generally indicates that front and back associated objects are in a "or" relationship.

Embodiments of the present application are described clearly and completely below in combination with the accompanying drawings in the embodiments of the present application.

Figure 1:
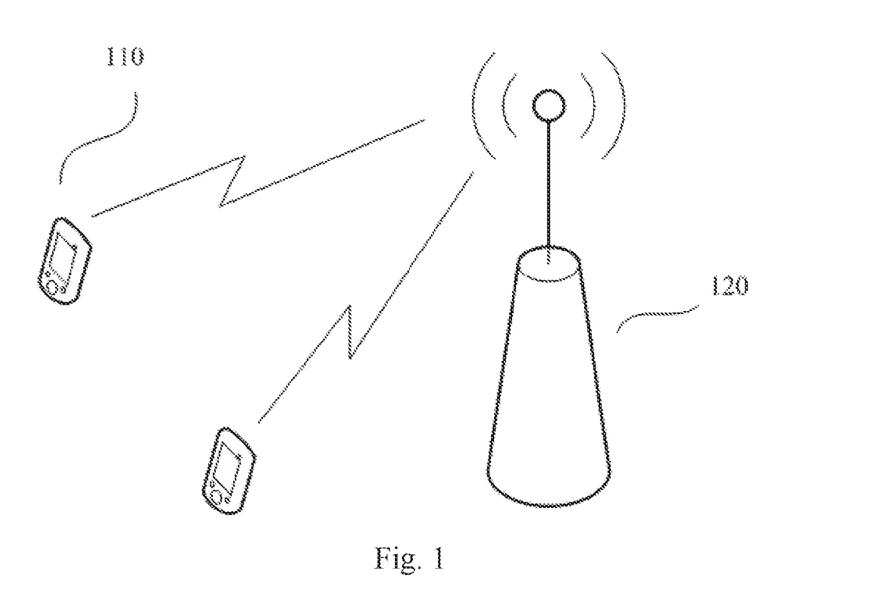
FIG. 1 is a schematic diagram of a delayed network architecture in an embodiment of the present application.

FIG. 1 exemplarily shows a schematic diagram of a possible communication scene provided by an embodiment of the present application. As shown in FIG. 1, a terminal 110 is accessed to a radio network through a radio access network (RAN) node 120, so that the service of an external network (such as the internee) is acquired through the radio network, or the terminal 110 performs communication with other terminals through the radio network.

The terminal is also known as user equipment (UE), a mobile station (MS), a mobile terminal (MT) and the like and is equipment providing a voice and/or data connectivity for a user, such as handheld equipment and vehicle-mounted equipment with a wireless connection function. At present, some terminals are exampled as a mobile phone, a tablet personal computer, a notebook computer, a palmtop computer, a mobile internet device (MID), wearable equipment, virtual reality (VR) equipment, augmented reality (AR) equipment, a wireless terminal in industrial control, a wireless terminal in self driving, a wireless terminal in a remote medical surgery, a wireless terminal in a smart grid, a wireless terminal in transportation safety, a wireless terminal in a smart city and a wireless terminal in a smart home.

An RAN is a part of accessing a terminal to a radio network in a network. The RAN node (or equipment) is a node (or equipment) in the radio access network and may also be known as a base station. At present, some RAN nodes are exampled as a gNB, a transmission reception point (TRP), an evolved node B (eNB), a radio network controller (RNC), a. node B (NB), a base station controller (BSC), a base transceiver station (BTS), a home base station (such as a home evolved NodeB or a home Node B, HNB), a base band unit (BBU) or a wireless fidelity (Wifi) access point (AP). In addition, in a network structure, the RAN may include a centralized unit (CU) node and distributed unit (DU) nodes, According to such the structure, protocol layers of the eNB in a long term evolution (LTE) system are separated, functions of parts of the protocol layers are centrally controlled on a CU, functions of parts or all of the remaining protocol layers are distributed in DUs, and the DUs are centrally controlled by the CU.

The following embodiments in the present application are described with an example in which the RAN node is used as a base station.

In the embodiment of the present application, a correspondence may exist between a. synchronization block and a paging-scheduling signaling message. The synchronization block and the paging-scheduling signaling message between which the correspondence exists are transmitted by using the same beam and have the same airspace characteristic. If a correspondence exists between one synchronization block and one paging-scheduling signaling message, the synchronization block and the paging-scheduling signaling message may also known as quasi-co-location (QCL). The QCL may also known as co-location assumption.

In one embodiment, one synchronization block corresponds to one paging-scheduling signaling message.

In one embodiment, an SS block burst set includes one or more synchronization blocks known as reserved synchronization blocks, the reserved synchronization blocks refer to reserved resources for transmitting the synchronization blocks, and the resources may actually transmit the synchronization blocks or not actually transmit the synchronization blocks. The actually transmitted synchronization block resources are known as actually transmitted synchronization blocks. The reserved synchronization blocks in one SS block burst set may include actually transmitted synchronization blocks and synchronization blocks which are not actually transmitted. For such a situation, the correspondence between the synchronization block and the paging-scheduling signaling message refers to a correspondence between each of the actually transmitted synchronization blocks and the paging-scheduling signaling message or refers to a correspondence between each of the reserved synchronization blocks (including the actually transmitted synchronization blocks and the synchronization blocks which are not actually transmitted) and the paging-scheduling signaling message.

In one embodiment, the correspondence between the synchronization block and the paging-scheduling signaling message may also include the following meanings:

a correspondence between a synchronization block and a paging-scheduling signaling message corresponding to the synchronization block. In one embodiment, one synchronization block corresponds to one paging-scheduling signaling message; In one embodiment, one synchronization block corresponds to a plurality of paging-scheduling signaling messages; and In one embodiment, a plurality of synchronization blocks correspond to a plurality of paging-scheduling signaling messages. In one embodiment, one example of the correspondence between the synchronization block and the paging-scheduling signaling message corresponding to the synchronization block may be that a. first actually transmitted synchronization block in the SS block burst set corresponds to a first paging-scheduling signaling message in a paging-scheduling signaling message set, a second actually transmitted synchronization block in the SS block burst set corresponds to a second paging-scheduling signaling message in the paging-scheduling signaling message set and so on.

In one embodiment, another example of the correspondence between the synchronization block and the paging-scheduling signaling message corresponding to the synchronization block may be that a first reserved synchronization block in the SS block burst set corresponds to the first paging-scheduling signaling message in the paging-scheduling signaling message set, a second reserved synchronization block in the SS block burst set corresponds to the second paging-scheduling signaling message in the paging-scheduling signaling message set and so on.

The correspondence between the synchronization block and the paging-scheduling signaling message may be represented by a time interval between the synchronization block and the paging-scheduling signaling message. The time interval may be the number of time units, and one time unit may be a symbol or a time slot or other units for representing time durations. The time interval may be informed through a broadcast channel or predefined through a protocol. For example, the time interval, predefined through the protocol, between the synchronization block and the paging-scheduling signaling message is 5 ms.

Since the correspondence exists between the synchronization block and the paging-scheduling signaling message, after a terminal receives and caches the synchronization block and the paging-scheduling signaling message, a target synchronization block (such as a synchronization block with the optimal performance) is obtained by beam scanning, then, a paging-scheduling signaling message corresponding to the target synchronization block may be determined according to the correspondence, and furthermore, the paging-scheduling signaling message may be demodulated to acquire paging information.

In the embodiment of the present application, the correspondence between the synchronization block and the paging-scheduling signaling message may be predetermined, namely defined in a protocol, may also be pre-configured to be publically known by the terminal and the base station and may further be transmitted to the terminal by the base station through a signaling message.

In the embodiment of the present application, frequency division multiplexing or time division multiplexing may be adopted as a multiplexing mode of the synchronization block and the paging-scheduling signaling message.

The multiplexing mode of the synchronization block and the paging-scheduling signaling message may be predetermined, namely defined in the protocol, may also be pre-configured to be publically known by the terminal and the base station and may further be transmitted to the terminal by the base station through a signaling message.

The correspondence between the synchronization block and the paging-scheduling signaling message is determined in a pre-defined or configured way in the embodiment of the present application so that the base station may flexibly allocate resources, and the terminal may receive the paging-scheduling signaling message according to beam information of the synchronization block, so that unnecessary beam scanning is reduced.

The embodiment of the present application is described in detail below in combination with the accompanying drawings.

Figure 2:
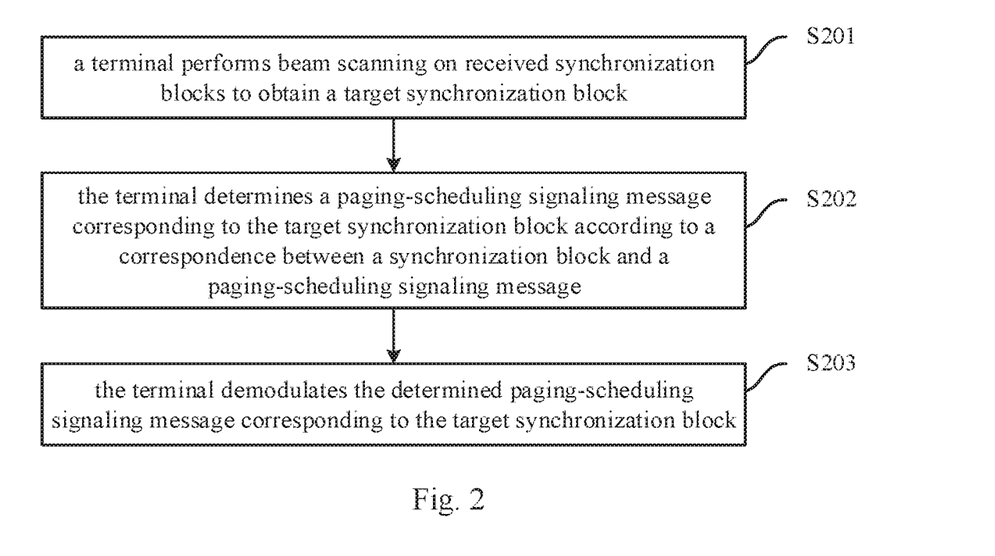
FIG. 2 is a schematic flow diagram of a terminal side provided by an embodiment of the present application.

Referring to FIG. 2 which is a schematic flow diagram of a terminal side provided by an embodiment of the present application, as shown in the figure, the process may include:

S201: a terminal performs beam scanning on received synchronization blocks to obtain a target synchronization block.

The target synchronization block may be a synchronization block with the optimal performance. The terminal may determine the synchronization block with the optimal performance in the synchronization blocks by performing beam scanning on the received and cached synchronization blocks.

In one embodiment, before the step, the terminal may receive a paging-scheduling signaling message according to a multiplexing mode of a synchronization block and the paging-scheduling signaling message, and if the multiplexing mode of the synchronization block and the paging-scheduling signaling message is frequency division multiplexing, the terminal receives the paging-scheduling signaling message on a symbol for transmitting the synchronization block; and if the multiplexing mode of the synchronization block and the paging-scheduling signaling message is time division multiplexing, the terminal receives the synchronization block and the paging-scheduling signaling message on different symbols or time slots.

S202: the terminal determines a paging-scheduling signaling message corresponding to the target synchronization block according to a correspondence between the synchronization block and the paging-scheduling signaling message, Further, the above-mentioned process may further include:

S203: the terminal demodulates the determined paging-scheduling signaling message corresponding to the target synchronization block.

In the step, the terminal may demodulate the cached paging-scheduling signaling message corresponding to the target synchronization block to obtain paging information.

In one embodiment, in the above-mentioned embodiment, the correspondence between the synchronization block and the paging-scheduling signaling message may be predetermined or pre-configured. The correspondence between the synchronization block and the paging-scheduling signaling message may also be transmitted to the terminal by the base station. In one embodiment, the above-mentioned process may also include the following step:

the terminal receives correspondence indication information transmitted by the base station, and the correspondence indication information is used for indicating the correspondence between the synchronization block and the paging-scheduling signaling message.

In one embodiment, the correspondence indication information is In one embodiment used for indicating the number of time units of the interval between the synchronization block and the paging-scheduling signaling message corresponding to the synchronization block, and the time units include symbols or time slots. For example, the number p of the symbols indicated by the correspondence indication information represents that a paging-scheduling signaling message corresponding to a given synchronization block is transmitted on p symbols behind the synchronization block.

In one embodiment, the correspondence indication information may be carried in a broadcast channel.

In one embodiment, in the above-mentioned embodiment, the multiplexing mode of the synchronization block and the paging-scheduling signaling message may be predetermined or pre-configured. The correspondence between the synchronization block and the paging-scheduling signaling message may also be transmitted to the terminal by the base station. In one embodiment, the above-mentioned process may further includes the following step:

the terminal receives multiplexing mode indication information transmitted by the base station, and the multiplexing mode indication information is used for indicating the multiplexing mode of the synchronization block and the paging-scheduling signaling message.

In one embodiment, the multiplexing mode indication information may be transmitted through a broadcast signaling message. In one embodiment, in one example, the terminal receives the broadcast signaling message, and the broadcast signaling message carries the multiplexing mode indication information, the broadcast signaling message may be a cell-level broadcast signaling message, and the cell-level broadcast signaling message may be received by terminals in corresponding cells. For example, the cell-level broadcast signaling message may be scrambled by a radio network temporary identity (RNTI) for identifying a cell where the terminal is located so that all the terminals in the corresponding cells may receive the broadcast signaling message. In another example, the terminal receives a broadcast signaling message, and the broadcast signaling message carries the multiplexing mode indication information, the broadcast signaling message may be a user-group-level broadcast signaling message, and the user-group-level broadcast signaling message may be received by terminals in corresponding user groups. For example, the user-group-level broadcast signaling message may be scrambled by an RNTI for identifying a user group where the terminal is located so that all the terminals in the corresponding user groups may receive the broadcast signaling message.

In one embodiment, the multiplexing mode indication information may be carried in a remaining minimum system information (RMSI) or other system information (OSI).

Figure 3:
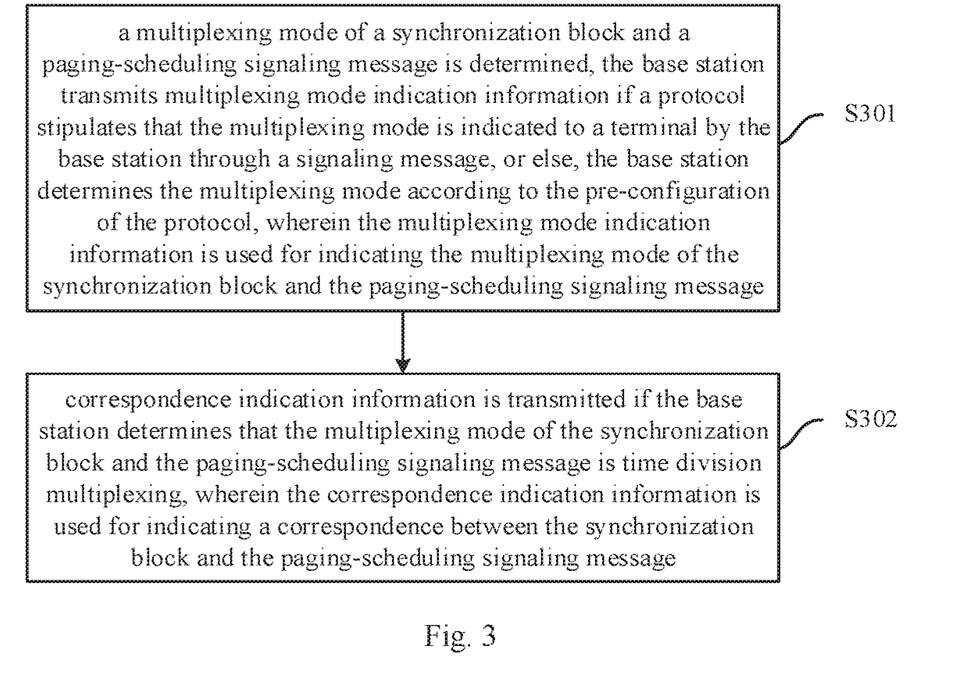
FIG. 3 is a schematic flow diagram of a base station side provided by an embodiment of the present application.

Referring to FIG. 3 which is a schematic flow diagram of a base station side provided by an embodiment of the present application, as shown in the figure, the process may include:

S301: a base station determines a multiplexing mode, and the base station transmits multiplexing mode indication information if a protocol stipulates that the multiplexing mode is indicated by the base station through a signaling message, and the multiplexing mode indication information is used for indicating a multiplexing mode of a synchronization block and a paging-scheduling signaling message.

In the step, In one embodiment, the base station may determine the multiplexing mode of the synchronization block and the paging-scheduling signaling message according to a stipulation in the protocol and/or an actual scene. The multiplexing mode includes frequency division multiplexing and time division multiplexing.

In one embodiment, whether the multiplexing mode of the synchronization block and the paging-scheduling signaling message is required to be indicated to the terminal by the base station or not may be stipulated in the protocol, if so, the base station transmits the multiplexing mode indication information.

S302: correspondence indication information is transmitted if the base station determines that the multiplexing mode of the synchronization block and the paging-scheduling signaling message is time division multiplexing, and the correspondence indication information is used for indicating the correspondence between the synchronization block and the paging-scheduling signaling message.

In the step, the base station may transmit the multiplexing mode indication information through a broadcast signaling message. In one embodiment, in one example, the base station transmits a broadcast signaling message, and the broadcast signaling message carries the multiplexing mode indication information, and the broadcast signaling message is a cell-level broadcast signaling message, for example, the cell-level broadcast signaling message is scrambled by an RNTI for identifying a cell. In another example, the base station transmits a broadcast signaling message, and the broadcast signaling message carries the multiplexing mode indication information, and the broadcast signaling message is a user-group-level broadcast signaling message, for example, the user-group-level broadcast signaling message is scrambled by an RNTI for identifying a user group.

In the above-mentioned process, the related description of the correspondence between the synchronization block and the paging-scheduling signaling message may refer to the above-mentioned embodiment, the descriptions thereof are omitted herein.

Embodiments of the present application further provides a terminal, and the terminal may implement functions of the terminal side in the above-mentioned embodiment.

Figure 4:
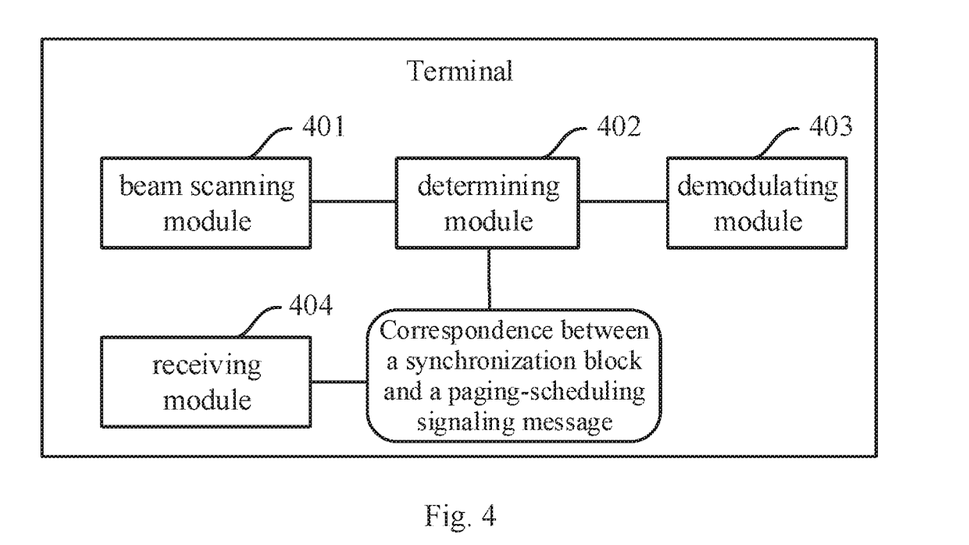
FIG. 4 is a schematic structural diagram of a terminal provided by an embodiment of the present application.

Referring to FIG. 4 which is a schematic structural diagram of a terminal provided by an embodiment of the present application, as shown in the figure, the terminal may include a beam scanning module 401 and a determining module 402 and may further include a demodulating module 403 and a receiving module 404.

The beam scanning module 401 is configured to perform beam scanning on received synchronization blocks to obtain a target synchronization block; and the determining module 402 is configured to determine a paging-scheduling signaling message corresponding to the target synchronization block according to a correspondence between a synchronization block and a paging-scheduling signaling message.

In one embodiment, the demodulating module 403 is configured to demodulate the determined paging-scheduling signaling message.

In one embodiment, the correspondence between the synchronization block and the paging-scheduling signaling message is predetermined or pre-configured.

In one embodiment, the receiving module 404 is configured to receive correspondence indication information, and the correspondence indication information is used for indicating the correspondence between the synchronization block and the paging-scheduling signaling message.

In one embodiment, the correspondence indication information is in one embodiment used for indicating a time interval between the synchronization block and the paging-scheduling signaling message corresponding to the synchronization block.

In one embodiment, the receiving module 404 is configured to receive a paging-scheduling signaling message according to a multiplexing mode of the synchronization block and the paging-scheduling signaling message, and the multiplexing mode is predetermined or pre-configured.

In one embodiment, the receiving module 404 may also be configured to receive multiplexing mode indication information, and the multiplexing mode indication information is used for indicating the multiplexing mode of the synchronization block and the paging-scheduling signaling message.

In one embodiment, the receiving module 404 is In one embodiment configured to receive a broadcast signaling message, and the broadcast signaling message carries the multiplexing mode indication information, and the broadcast signaling message is a cell-level broadcast signaling message; or the receiving module 404 is configured to receive a broadcast signaling message, and the broadcast signaling message carries the multiplexing mode indication information, and the broadcast signaling message is a user-group-level broadcast signaling message.

In one embodiment, the determining module 402 is in one embodiment configured to determine, by the terminal, the paging-scheduling signaling message corresponding to the target synchronization block according to the correspondence if the multiplexing mode of the target synchronization block and the paging-scheduling signaling message corresponding to the target synchronization block is time division multiplexing.

Embodiments of the present application further provides a base station, and the base station may implement functions of the base station side in the above-mentioned embodiment.

Figure 5:
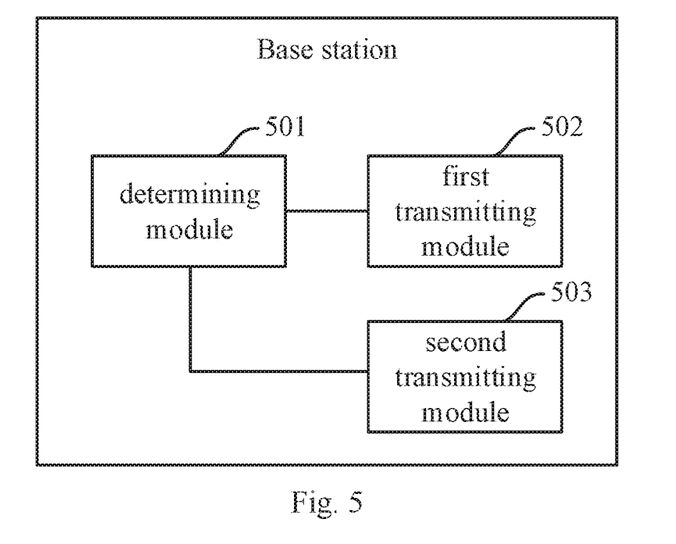
FIG. 5 is a schematic structural diagram of a base station provided by an embodiment of the present application.

Referring to FIG. 5 which is a schematic structural diagram of a base station provided by an embodiment of the present application, as shown in the figure, the base station may include a determining module 501, a first transmitting module 502 and a second transmitting module 503.

The determining module 501 is configured to determine a multiplexing mode of a synchronization block and a paging-scheduling signaling message;

the first transmitting module 502 is configured to transmit multiplexing mode indication information if a protocol specifies that the multiplexing mode is indicated to a terminal by the base station, and the multiplexing mode indication information is used for indicating the multiplexing mode of the synchronization block and the paging-scheduling signaling message; and the second transmitting module 503 is configured to transmit correspondence indication information if the multiplexing mode of the synchronization block and the paging-scheduling signaling message is determined to be time division multiplexing, and the correspondence indication information is used for indicating the correspondence between the synchronization block and the paging-scheduling signaling message, In one embodiment, the first transmitting module 502 is In one embodiment configured to transmit a broadcast signaling message, the broadcast signaling message carries the multiplexing mode indication information, and the broadcast signaling message is a cell-level broadcast signaling message; or the first transmitting module 502 is configured to transmit a broadcast signaling message, the broadcast signaling message carries the multiplexing mode indication information, and the broadcast signaling message is a user-group-level broadcast signaling message.

In one embodiment, the correspondence indication information is In one embodiment used for indicating a time interval between the synchronization block and the paging-scheduling signaling message corresponding to the synchronization block.

an embodiment of the present application further provides a terminal, and the terminal may implement functions of the terminal side in the above-mentioned embodiment.

Figure 6:
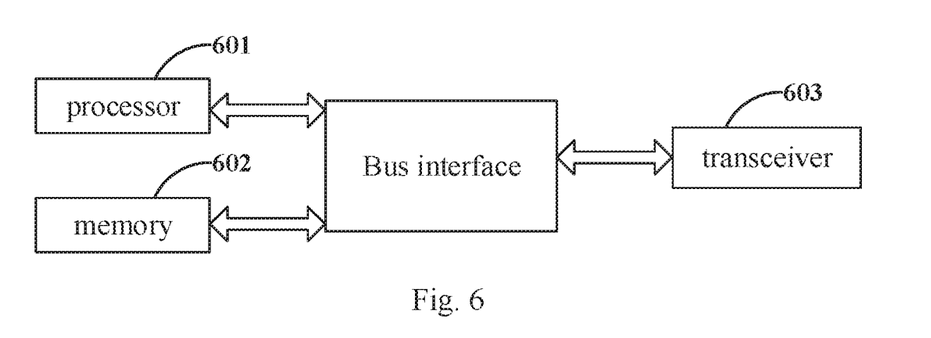
FIG. 6 is a schematic structural diagram of a terminal provided by another embodiment of the present application.

Referring to FIG. 6 which is a schematic structural diagram of a communication device provided by an embodiment of the present application, as shown in the figure, the communication device may include a processor 601, a memory 602, a transceiver 603 and a bus interface.

The processor 601 takes charge of bus architecture management and general processing, and the memory 602 may store data used when the processor 601 performs operations. The transceiver 603 is configured to receive and transmit the data under the control of the processor 601.

A bus architecture may include any number of interconnected buses and bridges to link various circuits of one or more processors represented by the processor 601 and memories represented by the memory 602 In one embodiment. The bus architecture may also link various other circuits such as peripheral equipment, a voltage stabilizer and a power management circuit. The bus interface provides an interface. The processor 601 takes charge of bus architecture management and general processing, and the memory 602 may store the data used when the processor 601 performs operations.

A process disclosed in the embodiment of the present application may be applied to the processor 601 or implemented by the processor 601. In the implementation process, each step of a signal processing process may be completed by an integrated logic circuit of hardware in the processor 601 or an instruction in a software form. The processor 601 may be a universal processor, a digital signal processor, an application-specific integrated circuit, a field programmable gate array or other programmable logic devices, a discrete gate or transistor logic device and a discrete hardware component and may implement or execute each method, step and logic block diagram disclosed in the embodiments of the present application. The universal processor may be a microprocessor or any conventional processors and the like. The process may be directly embodied to be completed by executing by the hardware processor or executing by a combination of a hardware module and a software module in the processor with reference to steps of the methods disclosed in the embodiments of the present application. The software module may be located in a mature storage medium in the art, such as a random access memory, a flash memory, a. read only memory, a programmable read only memory or an electrically erasable programmable memory and a register. The storage medium is located in the memory 602, the processor 601 reads information in the memory 602, and thus, steps of the signal processing process are completed in combination with the hardware of the processor.

In one embodiment, the processor 601 is configured to read programs in the memory 602 and perform operations: performing beam scanning on received synchronization blocks to obtain a target synchronization block; and determining a paging-scheduling signaling message corresponding to the target synchronization block according to a correspondence between a synchronization block and a paging-scheduling signaling message.

an embodiment of the present application further provides a communication device, and the communication device may implement functions of the base station side in the above-mentioned embodiment.

Figure 7:
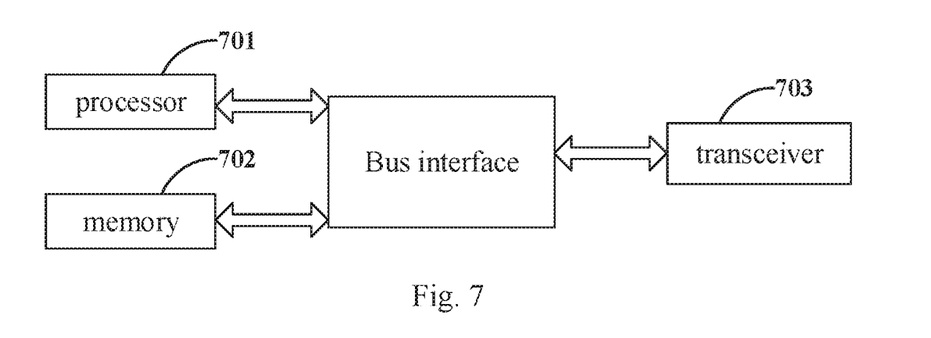
FIG. 7 is a schematic structural diagram of a base station provided by yet another embodiment of the present application.

Referring to FIG. 7 which is a schematic structural diagram of a base station provided by an embodiment of the present application, as shown in the figure, the base station may include a processor 701, a memory 702, a transceiver 703 and a bus interface.

The processor 701 takes charge of bus architecture management and general processing, and the memory 702 may store data used when the processor 701 performs operations. The transceiver 703 is configured to receive and transmit the data under the control of the processor 701.

A bus architecture may include any number of interconnected buses and bridges to link various circuits of one or more processors represented by the processor 701 and memories represented by the memory 702 In one embodiment. The bus architecture may also link various other circuits such as peripheral equipment, a voltage stabilizer and a power management circuit. The bus interface provides an interface. The processor 701 takes charge of bus architecture management and general processing, and the memory 702 may store the data used when the processor 701 performs operations, The process disclosed in the embodiment of the present application may be applied to the processor 701 or implemented by the processor 701. In the implementation process, each step of a signal processing process may be completed by an integrated logic circuit of hardware in the processor 701 or an instruction in a software form. The processor 701 may be a universal processor, a digital signal processor, an application-specific integrated circuit, a field programmable gate array or other programmable logic devices, a discrete gate or transistor logic device and a discrete hardware component and may implement or execute each method, step and logic block diagram disclosed in the embodiments of the present application. The universal processor may be a microprocessor or any conventional processors and the like. The process may be directly embodied to be completed by executing by the hardware processor or executing by a combination of a hardware module and a software module in the processor in combination with steps of the methods disclosed in the embodiments of the present application. The software module may be located in a mature storage medium in the art, such as a random access memory, a flash memory, a read only memory, a programmable read only memory or an electrically erasable programmable memory and a register. The storage medium is located in the memory 702, the processor 701 reads information in the memory 702, and thus, steps of the signal processing process are completed in combination with the hardware of the processor.

In one embodiment, the processor 701 is configured to read programs in the memory 702 and perform operations: determining a multiplexing mode of a synchronization block and a paging-scheduling signaling message, and transmitting multiplexing mode indication information through the transceiver if a protocol specifies that the multiplexing mode is indicated to a terminal by the base station, and the multiplexing mode indication information is used for indicating the multiplexing mode of the synchronization block and the paging-scheduling signaling message; and transmitting correspondence indication information through the transceiver if the multiplexing mode of the synchronization block and the paging-scheduling signaling message is determined to be time division multiplexing, and the correspondence indication information is used for indicating a correspondence between the synchronization block and the paging-scheduling signaling message.

The device provided by the embodiment of the present application may be computing equipment, and the computing equipment may be In one embodiment a desktop computer, a portable computer, a smartphone, a tablet personal computer, a personal digital assistant (PDA) and the like. The computing equipment may include a center processing unit (CPU), a memory, input/output equipment and the like, the input equipment may include a keyboard, a mouse, a touch screen and the like, and the output equipment may include display equipment such as a liquid crystal display (LCD), a cathode ray tube (CRT) and the like.

An embodiment of the present application further provides a computer readable storage medium. The computer readable storage medium stores a computer executable instruction configured to enable a computer to execute the process executed at the terminal side in the above-mentioned embodiment.

An embodiment of the present application further provides a computer readable storage medium. The computer readable storage medium stores a computer executable instruction configured to enable a computer to execute the process executed at the base station side in the above-mentioned embodiment.

Embodiments of the present application may provide the methods, systems or computer program products. Therefore, a full-hardware embodiment, a full-software embodiment or a software and hardware aspect combination embodiment form may be adopted in the present application. In addition, forms of the computer program products implemented on one or more computer available storage media (including, but not limited to a magnetic disk memory, a CD-ROM, an optical memory and the like) containing computer available program codes may be adopted in the present application.

The present application is described with reference to the flow diagrams and/or block diagrams of the methods, equipment (systems) and computer program products according to the embodiments of the present application. It should be understood that each process and/or block in the flow diagrams and/or block diagrams as well as combinations of the processes and/or blocks in the flow diagrams and/or block diagrams may be implemented by computer program instructions. These computer program instructions may be provided to a universal computer, a special-purpose computer, an embedded processor or a processor of other programmable data processing equipment to generate a machine, so that instructions executed by the computer or the processor of the other programmable data processing equipment generate devices for implementing appointed functions in one or more processes in the flow diagrams and/or one or more blocks in the block diagrams.

These computer program instructions may also be stored in a computer readable memory for guiding the computer or the other programmable data processing equipment to work in a specific way, so that the instructions stored in the computer readable memory generate a product including an instruction device, and the instruction device implements appointed functions in one or more processes in the flow diagrams and/or one or more blocks in the block diagrams.

These computer program instructions may also be loaded on the computer or the other programmable data processing equipment, so that a series of operation steps are performed on the computer or the other programmable equipment to generate processing implemented by the computer, and thus, the instructions executed on the computer or the other programmable equipment provide steps for implementing the appointed functions in one or more processes in the flow diagrams and/or one or more blocks in the block diagrams.

The invention claimed is:

1. An association method for a synchronization block and a paging-scheduling signaling message, comprising:
   performing, by a terminal, beam scanning on a received synchronization block to obtain a target synchronization block; and
   determining, by the terminal, a paging-scheduling signaling message corresponding to the target synchronization block according to a correspondence between the synchronization block and the paging-scheduling signaling message;
   wherein the method further comprises:
   receiving, by the terminal, multiplexing mode indication information; wherein the multiplexing mode indication information is used for indicating the multiplexing mode of the synchronization block and the paging-scheduling signaling message.

2. The method according to claim 1, further comprising:
   demodulating, by the terminal, determined paging-scheduling signaling message.

3. The method according to claim 1, wherein the correspondence between the synchronization block and the paging-scheduling signaling message is predetermined or pre-configured.

4. The method according to claim 1, further comprising:
   receiving, by the terminal, correspondence indication information, wherein the correspondence indication information is used for indicating the correspondence between the synchronization block and the paging-scheduling signaling message.

5. The method according to claim 4, wherein the correspondence indication information is used for indicating a time interval between the synchronization block and the paging-scheduling signaling message corresponding to the synchronization block.

6. The method according to claim 1, further comprising:
receiving, by the terminal, the paging-scheduling signaling message according to a multiplexing mode of the synchronization block and the paging-scheduling signaling message, wherein the multiplexing mode is predetermined or pre-configured.

7. The method according to claim 1, wherein the receiving, by the terminal, multiplexing mode indication information, comprises:
receiving, by the terminal, a broadcast signaling message, wherein the broadcast signaling message carries the multiplexing mode indication information, and the broadcast signaling message is a cell-level broadcast signaling message, or
receiving, by the terminal, a broadcast signaling message, wherein the broadcast signaling message carries the multiplexing mode indication information, and the broadcast signaling message is a user-group-level broadcast signaling message.

8. The method according to claim 1, wherein the determining, by the terminal, the paging-scheduling signaling message corresponding to the target synchronization block according to the correspondence between the synchronization block and the paging-scheduling signaling message comprises:
determining, by the terminal, the paging-scheduling signaling message corresponding to the target synchronization block according to the correspondence if the multiplexing mode of the target synchronization block and the paging-scheduling signaling message corresponding to the target synchronization block is time division multiplexing.

9. An instruction method, comprising:
determining, by a base station, a multiplexing mode of a synchronization block and a paging-scheduling signaling message, and transmitting, by the base station, multiplexing mode indication information if a protocol stipulates that the multiplexing mode is indicated to a terminal by the base station, wherein the multiplexing mode indication information is used for indicating the multiplexing mode of the synchronization block and the paging-scheduling signaling message; and
transmitting correspondence indication information if the base station determines that the multiplexing mode of the synchronization block and the paging-scheduling signaling message is time division multiplexing, wherein the correspondence indication information is used for indicating a correspondence between the synchronization block and the paging-scheduling signaling message.

10. The method according to claim 9, wherein the transmitting, by the base station, the multiplexing mode indication information comprises:
transmitting, by the base station, a broadcast signaling message, wherein the broadcast signaling message carries the multiplexing mode indication information, and the broadcast signaling message is a cell-level broadcast signaling message; wherein the correspondence indication information is used for indicating a time interval between the synchronization block and the paging-scheduling signaling message corresponding to the synchronization block, or
transmitting, by the base station, a broadcast signaling message, wherein the broadcast signaling message carries the multiplexing mode indication information, and the broadcast signaling message is a user-group-level broadcast signaling message; wherein the correspondence indication information is used for indicating a time interval between the synchronization block and the paging-scheduling signaling message corresponding to the synchronization block.

11. A base station, comprising a processor, a memory and a transceiver, the processor, the memory and the transceiver being connected by a bus; and the processor being configured to read programs in the memory to implement the instruction method of claim 9.

12. The base station according to claim 11, wherein the processor is configured to:
transmit a broadcast signaling message through the transceiver, wherein the broadcast signaling message carries the multiplexing mode indication information, and the broadcast signaling message is a cell-level broadcast signaling message; wherein the correspondence indication information is used for indicating a time interval between the synchronization block and the paging-scheduling signaling message corresponding to the synchronization block, or
transmit a broadcast signaling message through the transceiver, wherein the broadcast signaling message carries the multiplexing mode indication information, and the broadcast signaling message is a user-group-level broadcast signaling message; wherein the correspondence indication information is used for indicating a time interval between the synchronization block and the paging-scheduling signaling message corresponding to the synchronization block.

13. A terminal, comprising a processor, a memory and a transceiver, the processor, the memory and the transceiver being connected by a bus; and the processor being configured to read programs in the memory to:
perform beam scanning on a received synchronization block to obtain a target synchronization block; and
determine a paging-scheduling signaling message corresponding to the target synchronization block according to a correspondence between a synchronization block and a paging-scheduling signaling message;
wherein the processor is further configured to receive multiplexing mode indication information, wherein the multiplexing mode indication information is used for indicating a multiplexing mode of the synchronization block and the paging-scheduling signaling message.

14. The terminal according to claim 13, wherein the processor is further configured to:
demodulate determined paging-scheduling signaling message.

15. The terminal according to claim 13, wherein the correspondence between the synchronization block and the paging-scheduling signaling message is predetermined or pre-configured.

16. The terminal according to claim 13, wherein the processor is further configured to:
receive correspondence indication information through the transceiver, wherein the correspondence indication information is used for indicating the correspondence between the synchronization block and the paging-scheduling signaling message.

17. The terminal according to claim 16, wherein the correspondence indication information is used for indicating a time interval between the synchronization block and the paging-scheduling signaling message corresponding to the synchronization block.

18. The terminal according to claim 13, wherein the processor is further configured to:
  receive the paging-scheduling signaling message according to a multiplexing mode of the synchronization block and the paging-scheduling signaling message, wherein the multiplexing mode is predetermined or pre-configured.

19. The terminal according to claim 13, wherein the processor is further configured to:
  receive a broadcast signaling message through the transceiver, wherein the broadcast signaling message carries the multiplexing mode indication information, and the broadcast signaling message is a cell-level broadcast signaling message, or
  receive a broadcast signaling message through the transceiver, wherein the broadcast signaling message carries the multiplexing mode indication information, and the broadcast signaling message is a user-group-level broadcast signaling message.

20. The terminal according to claim 13, wherein the processor is configured to:
  determine the paging-scheduling signaling message corresponding to the target synchronization block according to the correspondence if the multiplexing mode of the target synchronization block and the paging-scheduling signaling message corresponding to the target synchronization block is time division multiplexing.

* * * * *